(No Model.)
H. E. KUHNER.
WHEEL.
No. 500,913. Patented July 4, 1893.
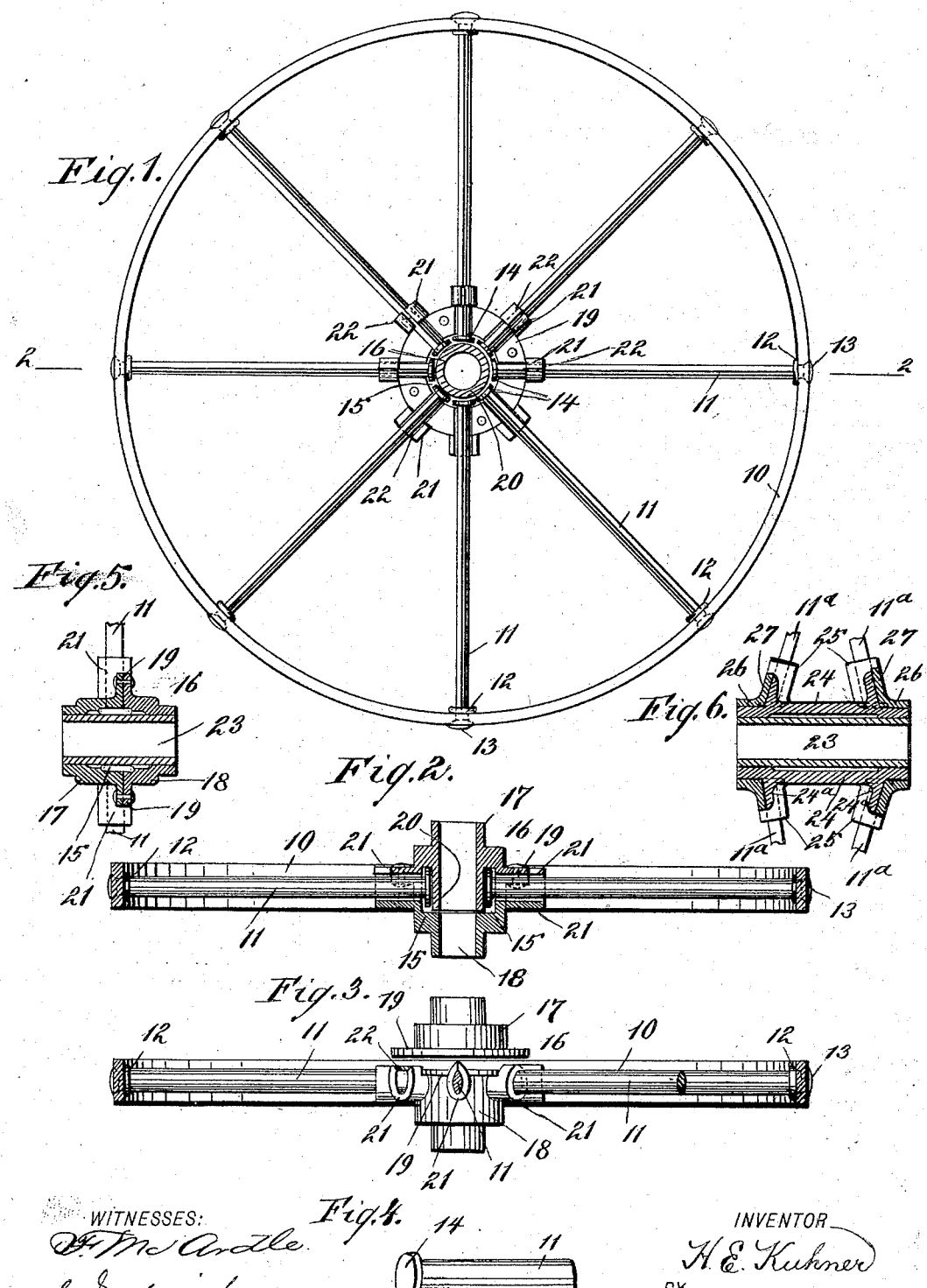
WITNESSES:
F. McArdle
C. Sedgwick
INVENTOR
H. E. Kuhner
BY
Munn & Co
ATTORNEYS.

UNITED STATES PATENT OFFICE.

HERMAN E. KUHNER, OF DAVENPORT, IOWA.

WHEEL.

SPECIFICATION forming part of Letters Patent No. 500,913, dated July 4, 1893.

Application filed October 28, 1892. Serial No. 450,208. (No model.)

*To all whom it may concern:*

Be it known that I, HERMAN E. KUHNER, of Davenport, in the county of Scott and State of Iowa, have invented a new and Improved Wheel, of which the following is a full, clear, and exact description.

My invention relates to improvements in wheels and especially to metallic wheels such as are used on agricultural machines.

The object of my invention is to produce a strong, cheap, and durable wheel, which is suitable for use on the various agricultural machines, and which may be easily put together or taken apart if necessary, and consequently which is adapted to have any broken portion easily replaced.

To this end my invention consists in a wheel, the construction of which will be hereinafter described and claimed.

Reference is to be had to the accompanying drawings forming a part of this specification, in which similar figures of reference indicate corresponding parts in all the views.

Figure 1 is a sectional elevation of the wheel embodying my invention, showing in elevation the inner end of one of the hub sections. Fig. 2 is a cross section on the line 2—2 in Fig. 1. Fig. 3 is a broken sectional plan of the wheel with the hub sections slightly separated. Fig. 4 is a broken detail view of one of the spokes of the wheel. Fig. 5 is a sectional view of a slightly modified form of hub and spokes, showing the hub provided with an inner box; and Fig. 6 is a longitudinal section of another modified form of hub adapted for use in connection with staggered spokes.

The wheel is provided with a metallic rim 10 which is punched out to receive the spokes 11, and the latter near their outer ends, are provided with shoulders 12 adapted to abut with the inner side of the rim or tire, and the spoke ends are reduced so as to enter the holes in the rim or tire. The spokes are placed in the tire while they are hot and their ends are riveted to the tire, the reduced ends being headed, as shown at 13. The spokes are preferably of oval cross section, although they may be of any desired shape, and at their inner ends they terminate in heads 14 which are adapted to be held in a recess 15 of the hub 16. The hub 16 is made in two sections 17 and 18 which are adapted to be separated at the center and which have abutting flanges 19 adapted to be riveted or bolted together.

The recess 15 is formed partly in one section and partly in the other, and it is annular so as to receive the inner ends of all the spokes. The section 17 of the hub has an inwardly extending collar 20 which is bored out in the usual manner, and this collar forms an abutment for the heads 14 of the spokes, as shown clearly in Figs. 1 and 2. The section 18 of the hub has radially extending sockets 21 which are adapted to receive the inner portions of the spokes, and the sockets are left open, as shown at 22, at one side until the spokes are pushed into them, after which the side edges of the sockets are pushed together so as to close firmly around the spokes. The outer portions of the sockets jut outward over the flanges 19, as shown clearly in Figs. 3 and 5.

The wheel may be made of any suitable material, but it is better that the rim or tire be made of rod iron, the spokes of steel, and the hub of malleable iron. When the wheel is put together the spokes are riveted to the rim or tire, as described, their inner end portions are pushed into the sockets 21 and recess 15, the section 18 is placed in position against the section 17, the flanges 19 of the two sections bolted or riveted together, and the side edges of the sockets closed upon the spokes. The sections 17 and 18 have a suitable bore to receive the axle, but if desired a special box 23 may be held in the hub for this purpose, as shown in Fig. 5.

Fig. 6 shows the manner in which the hub is adapted for staggered spokes, in which case the middle section 24 of the hub is adapted to receive the box 23 and is provided with sockets 25, substantially like those already described, to receive the spokes 11$^a$. Hub rings 26 are adapted to fit upon the ends of the sections 24, and these rings 26 have flanges 27 adapted to close against the flanges 24$^a$ of the hub, to which they are securely bolted.

From the foregoing description it will be observed that the wheel is of the simplest character, that it may be very easily put together, and that it is very strong.

Having thus described my invention, I claim as new and desire to secure by Letters Patent—

1. In a wheel, a hub formed of two flanged sections, one of the sections being provided with radially extending spoke sockets open at one side and adapted to be closed after the spokes have been inserted therein, substantially as described.

2. A wheel, consisting of the metallic rim 10, spokes 11, riveted to the rim and provided with heads 14 on their inner ends, and the hub 16 formed of two sections 17, 18, having abutting flanges 19, and provided with the recess 15, the section 17 being provided with the inwardly extending collar 20, and the section 18 with the radial sockets 21 open at one side and adapted to be closed after the spokes are inserted therein, substantially as herein shown and described.

HERMAN E. KUHNER.

Witnesses:
W. G. POWLESLAND,
T. ORME.